2,872,460

OXIDATION PROCESS

Gerald Scott, Manchester, England, assignor to Imperial Chemical Industries Limited, London, England, a corporation of Great Britain No Drawing. Application January 2, 1957
Serial No. 631,998

Claims priority, application Great Britain
January 4, 1956

6 Claims. (Cl. 260—364)

This invention relates to an improved oxidation process for the manufacture of benzanthrone.

It is known that benzanthrone can be made by oxidation of benzanthrene by means of dichromate and sulphuric acid, or by heating with air in the presence of a catalyst. These methods, however, are not entirely satisfactory since they necessitate starting with substantially pure benzanthrene if it is desired to obtain benzanthrone of high purity without recourse to considerable subsequent purification.

It has now been found that benzanthrene may readily be oxidised to benzanthrone by means of aqueous nitric acid, and that reaction takes place smoothly and leads to benzanthrone of high purity in excellent yield.

Thus according to my invention we provide an improved process for the oxidation of benzanthrene to benzanthrone which comprises treating benzanthrene with aqueous nitric acid.

The aqueous nitric acid used may contain between 5% and 70%, and preferably between 30% and 50%, by weight of nitric acid. The quantity of acid used is preferably at least one and one third molecular proportions of nitric acid for each molecular proportion of benzanthrene; more may be used if desired but the use of smaller quantities tends to result in incomplete oxidation of the benzanthrene.

The reaction may be carried out at a temperature up to the boiling point of the aqueous nitric acid. At temperatures near the boiling point, concentrations of nitric acid in excess of 50% result in the comcomitant formation of nitro bodies, so that the product is slightly impure; when low concentrations of nitric acid are used, however, the reaction is rather slow unless the temperature of the mixture is near the boiling point.

When using aqueous nitric acid containing 30% to 50% of nitric acid, it is usually convenient to carry out the reaction at about 70° C. The temperature of the mixture during reaction may be regulated for example by external cooling or by control of the rate of mixing of the nitric acid and benzanthrene.

Polycyclic hydrocarbons such as benzanthrene, as available or manufactured commercially, are usually in admixture with other hydrocarbons, frequently in considerable proportions, and these additional hydrocarbons can interfere seriously with the yield and isolation of the desired oxidation product. For example benzanthrene as obtained by pyrolysis of α-benzylnaphthalene contains much dihydrobenzanthrene, which possesses the structure of 1:10-trimethylene phenanthrene.

It has been found that not only may the isolated methylene group in benzanthrene be oxidised by nitric acid to a ketone group, but furthermore that accompanying hydrocarbon impurities, for example dihydrobenzanthrene, which contain no isolated methylene group linking two aromatic nuclei, are much less readily attacked, and when the conditions of treatment are not very severe remain unattacked.

Thus there may be used as starting material for the manufacture of benzanthrone an impure form of benzanthrene, the resultant benzanthrone obtained by the process of the present invention being obtained in a substantially pure form without the need for considerable subsequent purification. Also, since the hydrocarbons present as impurities are not attacked, they may be recovered rather than lost as waste oxidation products.

When the benzanthrene contains such impurities, it is preferred that the temperature at which the treatment is carried out should not exceed 70° C. and the concentration of the nitric acid used should not exceed 50% by weight in order to leave the impurities unattacked.

The benzanthrene used may be for example a product obtained by pyrolysis, for example of α-benzyl naphthalene. It is preferably used as a solution in a solvent immiscible with the aqueous nitric acid, and not attacked by the nitric acid under the conditions of the reaction, for example toluene, ligroin and nitrobenzene.

The benzanthrone may be isolated by known methods for example by filtration, followed by washing with a solvent for any unattacked hydrocarbon which may be present. Any traces of acid remaining may be removed by washing with water, or solutions of alkali or alkaline salts for example sodium bicarbonate and then with water.

Pure benzanthrone may be obtained by the process of the present invention more rapidly and conveniently than by prior art processes, owing to the simplicity of the reaction conditions, and the absence of by-products which are not easily separable from the benzanthrone.

The invention is illustrated but not limited by the following examples in which the parts are by weight.

Example 1

100 parts of a mixture of benzanthrene and dihydrobenzanthrene, having a melting range of 52–61° C., are dissolved in 200 parts of toluene and the temperature of the solution is adjusted to 35° C. The solution is stirred vigorously and 50 parts of an aqueous solution of nitric acid, which contains 35% by weight of the anhydrous acid, are added slowly. During the addition of the acid the temperature of the mixture rises but is not allowed to exceed 70° C. The temperature is controlled by external cooling and by regulating the input of the acid, at between 65° and 70° C. When evolution of nitrous fumes ceases, the mixture, which contains yellow crystals of benzanthrone, is cooled to 20° C. and 100 parts of water are added. The benzanthrone is separated from the aqueous and toluene layers by filtration, and is washed with water, with a 5% aqueous solution of sodium bicarbonate, again with water, and finally with 20 parts of toluene. The melting point of the benzanthrone, after drying, is 170–3° C. Partial evaporation of the toluene layer of the filtrates gives a further small yield of benzanthrone. Unchanged dihydrobenzanthrene is obtained from the residue by distillation (boiling point is 150–4/20 mm.). The yields are: Benzanthrone, 54 parts; dihydrobenzanthrene, 40 parts.

This corresponds to a yield of benzanthrone of 90% based on the benzanthrene content of the starting material.

The mixture of benzanthrene and dihydrobenzanthrene used in the procedure of this example is obtainable by pyrolysis of a mixture of α- and β-benzylnaphthalenes, in the ration 75:25, as described for example in British Patent No. 409,770.

Example 2

14 parts of purified benzanthrene having a melting point of 84° C. are dissolved in 28 parts of toluene at 35° C. With vigorous stirring 40 parts of an aqueous solution of nitric acid containing 35 parts by weight of the anhydrous acid are added slowly in the manner described in Example 1. The precipitated benzanthrone is then isolated and treated in the manner described in Example 1. The yield of benzanthrone is 14 parts, corresponding to a yield of 93.5% of theory based on the benzanthrene reacted.

What I claim is:

1. Process for the oxidation of benzanthrene to benzanthrone which comprises treating benzanthrene with aqueous nitric acid containing between 5% and 70% by weight of nitric acid.

2. Process for the oxidation of benzanthrene to benzanthrone as claimed in claim 1 wherein the nitric acid used contains between 30% and 50% by weight of nitric acid.

3. Process for the oxidation of benzanthrene to benzanthrone as claimed in claim 1 wherein the quantity of acid used is at least one and one third molecular proportions of nitric acid for each molecular proportion of benzanthrene.

4. Process for the oxidation of benzanthrene to benzanthrone as claimed in claim 1 wherein the temperature at which the treatment is carried out does not exceed 70° C. and the concentration of the nitric acid used does not exceed 50% by weight.

5. Process for the oxidation of benzanthrene to benzanthrone as claimed in claim 1 wherein said reaction is carried out in the presence of an inert organic solvent which is immiscible with said aqueous nitric acid.

6. Process for the oxidation of benzanthrene to benzanthrone as claimed in claim 1 wherein the benzanthrene is used in a crude form admixed with hydrocarbon impurities.

References Cited in the file of this patent
UNITED STATES PATENTS 1,103,383    Singer et al. _____ July 14, 1914

OTHER REFERENCES

Elsevier's Encyclopaedia of Organic Chemistry, Series III—Carboisocyclic condensed compounds, volume 14 (supplement), 1951, page 345–s.